US010585633B2

(12) United States Patent
Liu (10) Patent No.: US 10,585,633 B2
(45) Date of Patent: Mar. 10, 2020

(54) METHOD FOR RECORDING CHIP USAGE STATE INFORMATION, CHIP OF IMAGING CARTRIDGE AND IMAGING CARTRIDGE (71) Applicant: APEX MICROELECTRONICS COMPANY LIMITED, Zhuhai (CN)

(72) Inventor: Weichen Liu, Zhuhai (CN)

(73) Assignee: APEX MICROELECTRONICS COMPANY LIMITED, Zhuhai (CN)

(*) Notice: Subject to any disclaimer, the term of this patent is extended or adjusted under 35 U.S.C. 154(b) by 0 days.

(21) Appl. No.: 16/190,438

(22) Filed: Nov. 14, 2018

(65) Prior Publication Data
US 2019/0079712 A1 Mar. 14, 2019

Related U.S. Application Data (63) Continuation-in-part of application No. 15/664,529, filed on Jul. 31, 2017, now Pat. No. 10,162,582.
(Continued)

(30) Foreign Application Priority Data

Jun. 21, 2012 (CN) .......................... 2012 1 0209303

(51) Int. Cl.
G06F 15/00 (2006.01)
G06F 3/12 (2006.01)
(Continued)

(52) U.S. Cl.
CPC ........ *G06F 3/1235* (2013.01); *B41J 2/17546* (2013.01); *G06F 3/121* (2013.01);
(Continued)

(58) Field of Classification Search
CPC .... G06F 3/1235; G06F 3/121; G06F 11/0733; G06F 11/0745; G06F 11/0778;
(Continued)

(56) References Cited

U.S. PATENT DOCUMENTS 6,533,383 B1    3/2003  Saruta et al.
7,492,663 B2*   2/2009  Fukano ............... B41J 2/17546
                                                365/233.1
(Continued)

FOREIGN PATENT DOCUMENTS

CN          101082796 A    12/2007
CN          201525179 U     7/2010
(Continued)

*Primary Examiner* — Mark R Milia
(74) *Attorney, Agent, or Firm* — Anova Law Group, PLLC (57) ABSTRACT The present invention provides a chip of an imaging cartridge, said imaging cartridge can install on an imaging device and the imaging cartridge chip couples with the imaging device by establishing a communication path between the imaging cartridge chip and the imaging device, the communication path comprises an address/data line and a clock signal line the imaging device conducts reading and writing operations to the imaging cartridge chip through the communication path by transmitting instructions or data via the address/data line and transmitting clock signal via the clock signal line as required by the imaging device, and the imaging cartridge chip comprises: a substrate, and an information storage section and a control section which are provided on the substrate, wherein: the information storage section comprises a prioritized writing area and a normal read-write area.

15 Claims, 6 Drawing Sheets

Related U.S. Application Data which is a continuation of application No. 15/047,589, filed on Feb. 18, 2016, now Pat. No. 9,753,680, which is a continuation-in-part of application No. 14/461,313, filed on Aug. 15, 2014, now abandoned, which is a continuation of application No. PCT/CN2013/075275, filed on May 7, 2013.

(51) Int. Cl.
*G06F 11/07* (2006.01)
*G06F 11/34* (2006.01)
*G06F 11/30* (2006.01)
*B41J 2/175* (2006.01)

(52) U.S. Cl.
CPC ...... *G06F 11/0733* (2013.01); *G06F 11/0745* (2013.01); *G06F 11/0778* (2013.01); *G06F 11/0787* (2013.01); *G06F 11/3013* (2013.01); *G06F 11/34* (2013.01); *G06F 11/3476* (2013.01)

(58) Field of Classification Search
CPC .. G06F 11/0787; G06F 11/3013; G06F 11/34; G06F 11/3476; B41J 2/17546
USPC ........................................................ 358/1.14
See application file for complete search history.

(56) References Cited

U.S. PATENT DOCUMENTS

| | | |
|---|---|---|
| 2004/0041275 A1 | 3/2004 | Higashida et al. |
| 2007/0064040 A1 | 3/2007 | Kim |
| 2009/0040650 A1 | 2/2009 | Bates et al. |
| 2010/0100357 A1 | 4/2010 | Harper et al. |
| 2010/0157766 A1 | 6/2010 | Gregg et al. |
| 2011/0013916 A1 | 1/2011 | Katoh |
| 2011/0134479 A1 | 6/2011 | Refstrup |
| 2012/0054374 A1 | 3/2012 | Carter et al. |

FOREIGN PATENT DOCUMENTS

| | | |
|---|---|---|
| CN | 101954797 A | 1/2011 |
| CN | 102381036 A | 3/2012 |
| CN | 102765256 A | 11/2012 |
| GB | 2346830 A | 8/2000 |
| JP | 2001256459 A | 9/2001 |
| JP | 2003076953 A | 3/2003 |
| JP | 2005174039 A | 6/2005 |
| JP | 2005190324 A | 7/2005 |
| JP | 2007183790 A | 7/2007 |
| JP | 201288779 A | 5/2012 |

\* cited by examiner

| | Information Content | |
|---|---|---|
| | chip service state parameter (initial value 0) | } 40 |
| 121 | times of installation (initial value 0) | |
| 122 | remaining amount of first recording material (8 bits) | |
| 123 | remaining amount of second recording material (8 bits) | 41 |
| ⋮ | ⋮ | |

| | Information Content | |
|---|---|---|
| 111 | times-of-writes parameter (initial value 0) | 40 |
| 121 | times of installation (initial value 0) | |
| 122 | remaining amount of first recording material (8 bits) | 41 |
| 123 | remaining amount of second recording material (8 bits) | |
| ⋮ | ⋮ | |

| | Information Content |
|---|---|
| 111 | times-of-writes parameter (initial value 0) |
| 112 | normal communication parameter (initial value 0) |
| 121 | times of installation (initial value 0) |
| 122 | remaining amount of first recording material (8 bits) |
| 123 | remaining amount of second recording material (8 bits) |
| ⋮ | ⋮ |

| | Information Content | |
|---|---|---|
| 113 | times-of-communication-faults parameter(initial value 0) | } 40 |
| 121 | times of installation (initial value 0) | |
| 122 | remaining amount of first recording material (8 bits) | |
| 123 | remaining amount of second recording material (8 bits) | } 41 |
| ⋮ | ⋮ | |

METHOD FOR RECORDING CHIP USAGE STATE INFORMATION, CHIP OF IMAGING CARTRIDGE AND IMAGING CARTRIDGE

CROSS-REFERENCE TO RELATED APPLICATIONS

This application is a continuation-in-part to U.S. patent application Ser. No. 15/664,529 entitled: "Method for Recording Chip Usage State Information, Chip of Imaging cartridge and Imaging cartridge," which is a continuation of U.S. patent application Ser. No. 15/047,589 entitled: "Method for Recording Chip Usage State Information, Chip of Imaging cartridge and Imaging cartridge," which is a continuation-in-part to U.S. patent application Ser. No. 14/461,313 entitled: "METHOD FOR RECORDING CHIP USAGE STATE INFORMATION, CHIP OF IMAGING BOX AND IMAGING BOX," filed Aug. 15, 2014, which claims priority to International Application No. PCT/CN2013/075275, filed on May 7, 2013, which claims the priority benefit of Chinese Patent Application No. 201210209303.5, filed on Jun. 21, 2012. The contents of the above identified applications are incorporated herein by reference in their entireties.

TECHNICAL FIELD

The present invention relates to imaging technologies and, in particular, relates to a method for recording chip usage state information, a chip of imaging cartridge and an imaging cartridge.

BACKGROUND

With the development of imaging technologies, imaging devices such as copier, printer, facsimile machine, word processor etc. are widely applied. An imaging device is provided with consumables such as an imaging cartridge for convenience of replacement, where the imaging cartridge is usually provided with a chip, which store information for enabling appropriate printing such as date code of manufacture, materials for the ink, the number of detachment of the ink cartridge and others. During the using process of the imaging cartridge, the imaging device needs to update data in the chip of the imaging cartridge continuously, so as to ensure that the chip always records the latest state of the imaging cartridge. Therefore, the chip in the imaging cartridge is especially important, if the chip deformed or damaged during the using process of the imaging cartridge, then the whole imaging cartridge will be unable to work. In order to guarantee the normal use of the imaging cartridge, the chip is required to represent a high performance. The performance of the chip is significantly improved through improving manufacturing process of the chip and adopting new technologies etc., however, in practical applications, there will still be problems in some chips, which result in that the imaging cartridge is unable to work.

In order to facilitate the manufacturer to find quality problems of the imaging cartridge, the existing imaging device usually writes such parameters as temperature, moisture, number of pages printed, on-off times of the printer, whether the imaging cartridge has been reinstalled or not, times of installation, application region, information of the manufacturer etc which relate to the imaging cartridge, the manufacturer can find quality problems of the imaging cartridge through collecting the information in the chip. However, the above state parameters are all imaging cartridge related information, which are written into the chip by the imaging device. Such state parameters can only represent the usage state of the imaging cartridge rather than that of the chip itself. Chip failure can lead to the unavailability of imaging cartridge as well. Therefore, the above parameters recorded in the chip of the prior art can only be used by the manufacturer for failure analysis on the imaging cartridge. Failure analysis on the chip cannot be conducted since the chip doesn't record its own usage state.

SUMMARY

In order to overcome the above defects of the prior art, the present invention provides a method for recording chip usage state information, a chip of imaging cartridge and an imaging cartridge, which provides powerful information to find and solve the communication problems between the chip and the imaging device.

The present invention provides a chip of an imaging cartridge, said imaging cartridge can install on an imaging device and the imaging cartridge chip couples with the imaging device by establishing a communication path between the imaging cartridge chip and the imaging device, the communication path comprises an address/data line and a clock signal line the imaging device conducts reading and writing operations to the imaging cartridge chip through the communication path by transmitting instructions or data via the address/data line and transmitting clock signal via the clock signal line as required by the imaging device, and the imaging cartridge chip comprises: a substrate, and an information storage section and a control section which are provided on the substrate, wherein: the information storage section comprises a prioritized writing area and a normal read-write area, the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device, the state information relating to the imaging cartridge stored in the normal read-write area comprises a ink data is about a remaining amount data of recording materials contained in the imaging cartridge, the control section is configured to: receive one bit of instructions or data synchronously with every clock signal period, and when the control section receives an ink data writing instruction from the imaging device, in the next clock signal period, update the chip service state parameter relating to the imaging cartridge chip stored in the prioritized writing area preferentially at first, and then receive one bit ink data to be written from the imaging device and rewrite the one bit ink data into the normal read-write area according to the ink data writing instruction from the imaging device.

The present invention further provides an imaging cartridge, containing recording materials, can install on an imaging device, said imaging cartridge comprising: an imaging cartridge chip, coupling with the imaging device by establishing a communication path between the imaging cartridge chip and the imaging device when the imaging cartridge installs on the imaging device, wherein the communication path comprises a address/data line and a clock signal line, the imaging device conducts reading and writing operations to the imaging cartridge chip through the communication path by transmitting instructions or data via the address/data line and transmitting clock signal via the clock signal line as required by the imaging device, and the imaging cartridge chip comprises a substrate, an information storage section and a control section provided on the substrate, wherein: the information storage section comprises a prioritized writing area and a normal read-write area, the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device, the state information relating to the imaging cartridge stored in the normal read-write area comprises a ink data is about a remaining amount data of recording materials contained in the imaging cartridge, and the control section is configured to: receive one bit of instructions or data synchronously with every clock signal period, when the control section receives an ink data writing instruction from the imaging device, in the next clock signal period, update the chip service state parameter relating to the imaging cartridge chip stored in the prioritized writing area preferentially at first, and then receive one bit ink data to be written from the imaging device and rewrites the one bit ink data into the normal read-write area according to the ink data writing instruction from the imaging device.

The present invention further provides a chip of an imaging cartridge, wherein said imaging cartridge can install on an imaging device and the imaging cartridge chip couples with the imaging device by establishing a communication path between the imaging cartridge chip and the imaging device, the communication path comprises a address/data line and a clock signal line, the imaging device conducts reading and writing operations to the imaging cartridge chip through the communication path by transmitting instructions or data via the address/data line and transmitting clock signal via the clock signal line as required by the imaging device, and the imaging cartridge chip comprises: a substrate, and an information storage section and a control section which are provided on the substrate, wherein: the information storage section comprises a prioritized writing area and a normal read-write area, the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device, the state information relating to the imaging cartridge stored in the normal read-write area comprises a ink data is about a remaining amount data of recording materials contained in the imaging cartridge, and the control section is configured to: receive one bit of instructions or data synchronously with every clock signal period, when the control section receives an ink data writing instruction from the imaging device, start to receive the ink data by bits synchronously with the clock signal and write the ink data into a volatile memory of the control section by bits immediately, and when all bits of the ink data received into the volatile memory, in a high/low level persistent period of a clock signal period, update the chip service state parameter relating to the imaging cartridge chip stored in the prioritized writing area preferentially at first, and then rewrite all bits of the ink data from the volatile memory into the normal read-write area.

The chip service state parameter comprises one or more of a times-of-writes parameter, a normal communication parameter, a times-of-reads parameter, a times-of-communication-faults parameter or a times-of-communication-interference parameter. And the triggering conditions comprise one or more of the following conditions: that the chip receives a read operation command sent by an imaging device, that the chip receives a write operation command sent by an imaging device, and that the control unit on the chip monitors a communication interference signal.

Either working environment of the chip of imaging cartridge, misoperation of the user, running out of read-write service life of the chip, or faults of the chip itself will lead to a fault of the chip. If a fault occurs to the chip of imaging cartridge when the chip was used only for a few times, then the fault may possibly be caused by the performance problem of the chip itself; if the chip of imaging cartridge has been read or written for many times, the reason of the fault may be that the chip is running out of normal service life.

When a fault occurs to the chip of imaging cartridge, through reading the chip service state parameter in the prioritized writing area of the information storage unit in the chip of imaging cartridge and performing data analysis on the chip service state parameter, it can be determined whether the fault occurred due to the performance problem of the chip itself or that the normal service life is running out, or the times of normal communication, times of communication faults and times of communication interference are obtained, further, by combining with data of usage state of the imaging cartridge recorded in each storage area in the normal read-write area, it is beneficial to finding the reason which causes the fault of the chip of imaging cartridge and the fault of the imaging cartridge.

In the method for recording chip usage state information, the chip of imaging cartridge and the imaging cartridge provided by the present invention, the information storage unit of the chip is provided with a prioritized writing area, the chip service state parameter recorded in the prioritized writing area can represent the usage state information of the chip itself. Moreover, since the prioritized writing area will firstly be accessed, the function of the usage state information will not be affected no matter whether the operation of the imaging device on the chip is successful or not, which provides powerful information to find and solve the communication problems between the chip and the imaging device, and thus is beneficial to find the reason of the faults occurred to the imaging cartridge and the chip.

BRIEF DESCRIPTION OF DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTIONS

Figure 1:
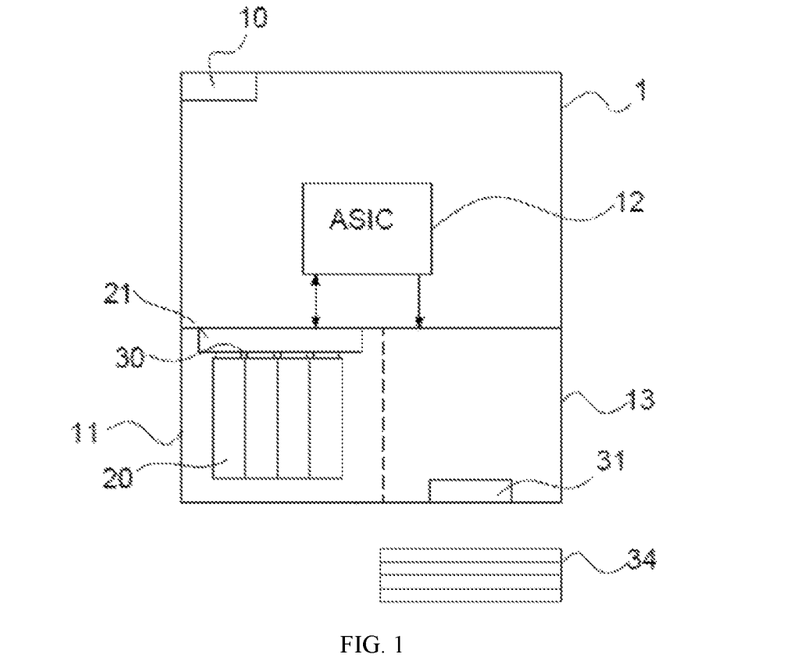
FIG. 1 is a diagrammatic depiction of an imaging device used in association with the present invention.

Referring now to the drawings, and particularly to FIG. 1, there is shown a diagrammatic depiction of an imaging device used in association with the present invention. Imaging device 1 includes a user interface 10, an imaging cartridges installation position 11, an Application Specific Integrated Circuit (ASIC) 12 and image recording unit 13. The user interface 10 is used to connect the computers, mobile phones, cameras, Internet and other external devices so that the imaging device can receive related instructions from such external devices. One or more imaging cartridges 20 are installed on the imaging cartridges installation position 11 in a detachable way which equipped with a chip 30. Different imaging cartridges 20 can carry the imaging substances of different colors or types, and provide such imaging substances to the image recording unit 13. Conventionally, a communication interface 21 is set on the imaging cartridge installation position 11. When the imaging cartridge 20 is installed on the imaging cartridge installation position 11, ASIC 12 communicates with chip 30 via the communication interface 21. ASIC 12 is the "heart" of imaging device, which is applied to analyze the instructions from the user interface 10, control the imaging operation of the image recording unit 13, record the status information of the imaging device 1 and the imaging cartridge 20, calculate the remaining amount of imaging substance in the imaging cartridge, read or write date from/into the chip 30, and etc.

In the context of the examples for imaging device 1 given above, image recording unit 13 can be, for example, an ink jet print-head unit or an electro-photographic printing unit, and includes an imaging head 31 used for forming an image on a substrate, such as a sheet of print media or a photoconductive member imaging cartridge 20 can be, for example, an ink supply tank, an ink jet print-head cartridge (PH), a toner tank, or an electro-photographic process (EP) cartridge, each of which containing a supply of an imaging substance, such as for example ink or toner, that is consumed during an imaging process. Imaging device 1 uses the imaging substance contained in imaging cartridge 20 to form an image on print media 34. Print media 34 can be, for example, sheets of paper, fabric or transparencies.

Those skilled in the art will recognize that image recording unit 13 and imaging cartridge 20 may be formed as individual discrete units, or may be combined in an integral unit. For example, in ink jet technology, such an integral unit may be an ink jet print-head cartridge PH including an ink reservoir and an ink jet print-head formed as a unitary consumable. Thus, for convenience, the term "imaging cartridge" is used to encompass either the discrete configuration or the integral configuration described above, and is an example of a consumable.

Figure 2:
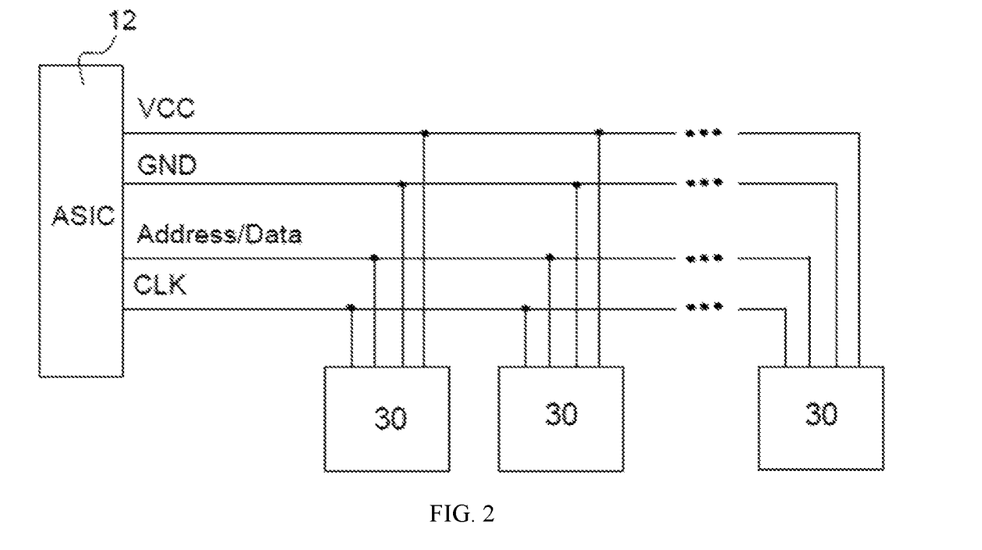
FIG. 2 is a schematic view of a connection between ASIC 12 and the imaging cartridge chip 30.

FIG. 2 is a schematic view of a connection between ASIC 12 and the imaging cartridge chip 30. When the imaging cartridge 20 is installed on the imaging cartridge installation position 11, the communication interface 21 will establish the bus connection between a plurality of chips 30 and ASIC 12. Conventionally, the bus connection includes power line VCC, grounding GND, clock line CLK and Address/Data line. However, there are also a small part of the imaging devices using wireless communication to establish connection between chip 30 and ASIC 12. The specific content of bus connection is subject to the communication protocol applied. During the operation of the imaging device, ASIC 12 may conduct reading and writing on the chip 30 at default timing as required by the imaging device. Default timing is a pre-designed operation rule in the imaging device, which could be: time when the imaging device is power on, time before the power cutoff of imaging device, time when a imaging operation ends and the time when the ASIC 12 detects that the imaging substances is about to run out. Reading and writing contents of ASIC 12 on the chip 30 are pre-set items based on the imaging requirements of the imaging device, such as imaging substance amount, imaging date, access count of the chip and other data closely related to the imaging device and imaging cartridge.

Figure 3:
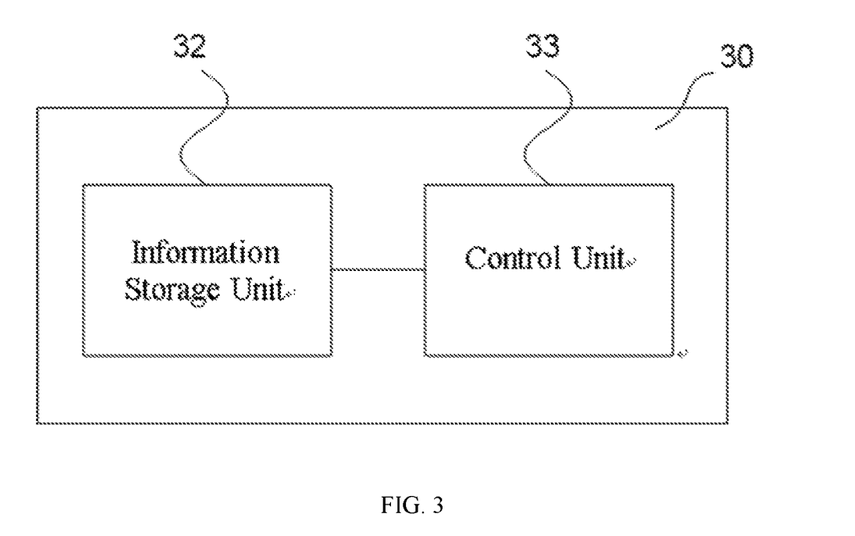
FIG. 3 is a schematic view of composition of a chip of imaging cartridge in the present invention.
Figure 4:
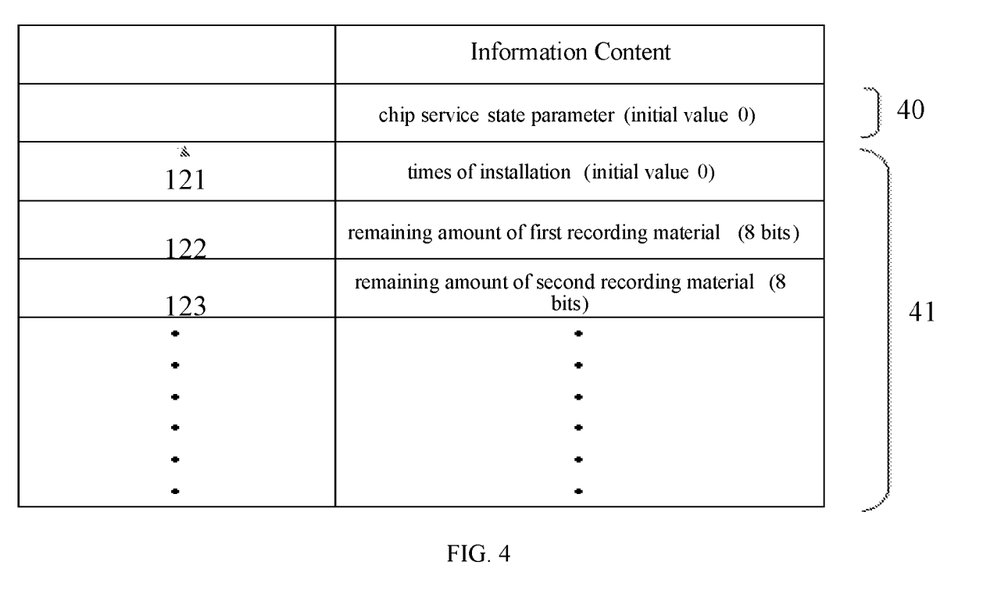
FIG. 4 is a schematic view of data arrangement of a chip information storage unit of an imaging cartridge in the present invention.

FIG. 3 is a schematic view of composition of a chip of imaging cartridge in the present invention, FIG. 4 is a schematic view of data arrangement of a chip information storage unit of an imaging cartridge in the present invention; as shown in FIG. 3 and FIG. 4, the chip of imaging cartridge 30 includes: a substrate, and an information storage unit 32 and a control unit 33 which are provided on the substrate; the information storage unit 32 includes a prioritized writing area 40 and a normal read-write area 41. During the process when imaging device visits information storage unit 33, the prioritized writing area 40 is rewritten preferentially.

Wherein, the prioritized writing area 40 is used by the control unit 33 to store data "proactively". "Proactively" means the control unit 33 doesn't operate as instructed by ASIC 12 of the imaging device, but actively store data in the prioritized writing area 40 when detecting at least one of the triggering conditions, which referred to as Non-instruction Data. By contrast, many of the current chips are all designed to access data as instructed after receiving the instructions from the imaging device. The prioritized writing area 40 of the chip 30 only used for storing Non-instruction Data, according to the present invention, it is used for storing a chip service state parameter, of which the initial value is 0.

The normal read-write area 41 is used by the control unit 33 to store and access data "passively". "Passively" means the control unit 33, upon receiving the instructions sent from the imaging device, reads/writes the data on the corresponding locations of the normal read-write area 41 on orders. The storage areas in the normal read-write area 41 respectively store state information of the imaging cartridge which will change with the print operation, such as times of installation of the imaging cartridge, remaining amount data of recording materials, number of pages printed etc., and identification data of the imaging cartridge which will not change with the print operation, such as open time, date of manufacture, serial number of the imaging cartridge etc. In this embodiment, a first storage area 121 in the normal read-write area 41 is used for storing data of times of installation of the imaging cartridge, a second storage area 122 and a third storage area 123 are respectively used for storing remaining amount of a first recording material and remaining amount of a second recording material. The data stored in the normal read-write area 41 is used for ASIC 12 to perform normal read-write operations. The normal read-write operations are specifically: ASIC 12 reads identification data of the imaging cartridge such as type of the imaging cartridge, color of the recording material, date of manufacture of the imaging cartridge etc. in the information storage unit 32, and state information of the imaging cartridge such as remaining amount of recording materials, number of pages printed etc., and the imaging device writes the new state data of the imaging cartridge such as remaining amount of recording materials, number of pages printed into the information storage unit 32, so as to update the state information of the imaging cartridge.

The control unit 33 is configured to execute the instruction information from ASIC 12 and hold the instruction information from the ASIC 12 when detecting at least one triggering conditions, so as to update the chip service status parameter values stored in the prioritized writing area 40 and execute the instruction from the ASIC 12 after the values of the chip service status parameter are successfully updated.

Figure 5:
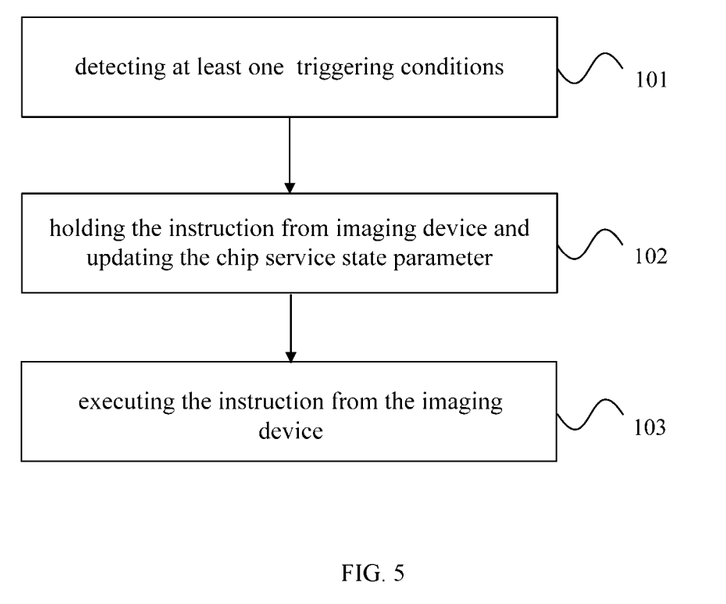
FIG. 5 is a flow diagram of a method for recording chip usage state information in the present invention.

FIG. 5 is a flowchart of recording the chip service status according to the present invention. Wherein, the chip includes a substrate, and the information storage unit 32 and the control unit 33 which are provided on the substrate, the information storage unit 32 includes the prioritized writing area 40 and the normal read-write area 41, as shown in FIG. 5, the method includes:

Step 101, the control unit 33 detects at least one of the triggering conditions;

Step 102, holding the instruction information from ASIC 12 and updating the chip service status parameter stored in the prioritized writing area 40. Specifically, the control unit 33 doesn't execute the commands (instruction information) from ASIC 12 for the time being, and firstly points to the address of prioritized writing area 40, so as to control the values of the chip service status parameter stored in the prioritized writing area 40 are updated, which specifically is to increase the values of the chip service status parameter by 1;

Step 103, executing the commands from ASIC 12 and updating the data stored in the corresponding storage areas in the normal read-write area 41 after executing step 102. Specifically, the control unit 33 points to the location of storage area 121 and access to the normal read-write area 41, so as to control the data stored in the corresponding storage areas of the normal read-write area 41 are updated by the imaging device.

In the embodiments provided with this article, the triggering conditions could be one or a few types of the following conditions: the chip receives a reading command from the imaging device; the chip receives a writing command from the imaging device; the control unit 33 of the chip monitors a communication interference signal. And the chip service state parameter comprises one or more of the following parameters: a times-of-writes parameter, a normal communication parameter, a times-of-reads parameter, a times-of-communication-faults parameter or a times-of-communication-interference parameter.

The chip of imaging cartridge, the imaging cartridge and the method for recording chip usage state information provided by this article can represent the usage state information of the chip itself through the chip service state parameter recorded in the prioritized writing area 40. Moreover, when the chip receives reading/writing commands sent by the imaging device or the control unit 33 monitors communication jamming signals, the control unit 33 points to the location of prioritized writing area 40 first, the prioritized writing area 40 is accessed in advance of the normal read-write area 41, and the chip service state parameter is updated preferentially. Hence, whether the imaging device successfully operates the chip or not doesn't affect the updating of chip service status parameter values. Such chip usage state information may play its due role in providing supportive materials to identify and solve the communication problems between the chip and the imaging device, and is beneficial to find the reason of the faults occurred to the chip.

In order to make the above-mentioned and other features and advantages of this invention, and the manner of attaining them, more apparent and the invention better to understood, the following description of embodiments give several examples for method of recording chip usage state information, which the triggering conditions and the chip service state parameter are particular conditions and parameter, taken in conjunction with the accompanying drawings.

Example 1

Figure 6:
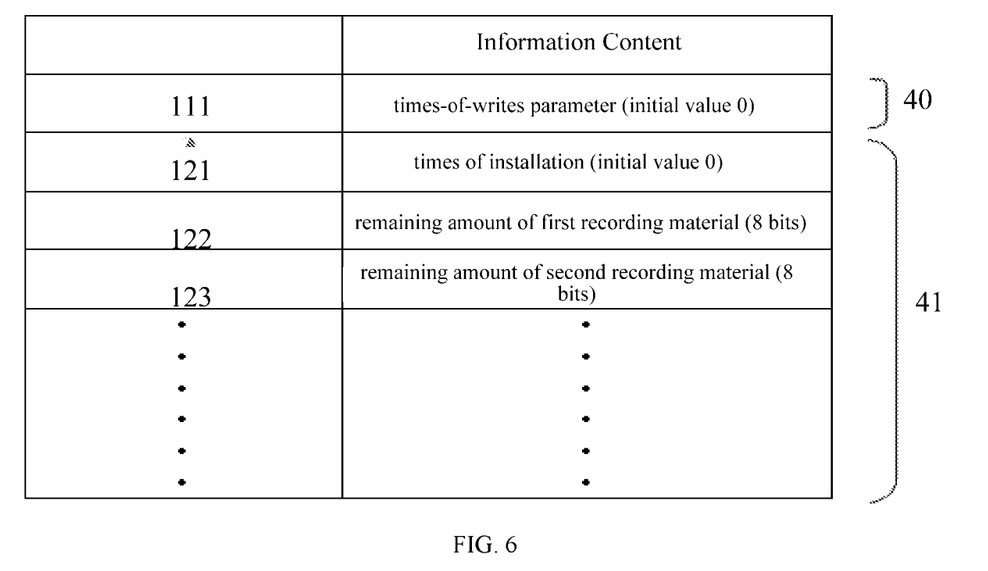
FIG. 6 is a schematic view of data arrangement of a chip information storage unit of an imaging cartridge in the first embodiment of the present invention.

In the first embodiment of the present invention, the triggering condition is the chip receives a writing command from the imaging device, and the chip service state parameter includes a times-of-writes parameter relate to the chip. FIG. 6 is a schematic view of data arrangement of a chip information storage unit of an imaging cartridge in the first embodiment of the present invention. As shown in FIG. 6, the information storage unit 32 includes the prioritized writing area 40 and the normal read-write area 41. During the process when the imaging device accesses the information storage unit, the prioritized writing area 40 is rewritten in advance of the normal read-write area 41. The storage area 111 in the prioritized writing area 40 is used for storing the times-of-writes parameter for the chip (initial value is 0), which proactively updated by the control unit 33. In this embodiment, a first storage area 121 in the normal read-write area 41 is used for storing data of times of installation of the imaging cartridge, a second storage area 122 and a third storage area 123 are respectively used for storing remaining amount of a first recording material and remaining amount of a second recording material. The data stored in the normal read-write area 41 is used for ASIC 12 to perform normal read-write operations.

Figure 7:
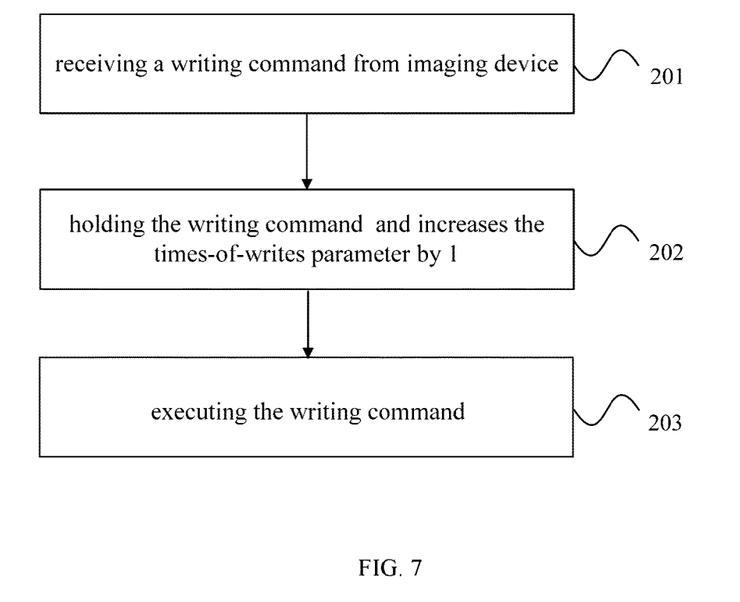
FIG. 7 is a flow diagram of a method for recording chip usage state information in a first embodiment of the present invention.

FIG. 7 is a flow diagram of a method for recording chip usage state information in the first embodiment of the present invention, as shown in FIG. 7, when the chip receives a writing command sent by the imaging device, the control unit 33, before executing the writing command from the imaging device, updates the chip service state parameter stored in the prioritized writing area first, which includes:

Step 201, the control unit 33 receives a writing command from ASIC 12.

Step 202, holding the writing command from ASIC 12 and updates the times-of-writes parameter stored in the prioritized writing area 40. Specifically, the control unit 33 doesn't execute the writing command from the imaging device for the time being, and firstly points to the address of a storage area 111, so as to control the value of the times-of-writes parameter stored in the prioritized writing area 40 is updated, which specifically is to increase the value of the times-of-writes parameter by 1;

Step 203, executing the writing command from ASIC 12 and rewrite the data stored in the corresponding storage areas in the normal read-write area 41 after executing step 202. Specifically, the control unit 33 points to the location of storage area 121 and access to the normal read-write area 41, so as to control the data stored in the corresponding storage areas of the normal read-write area 41 are updated by the imaging device.

Usually, the imaging device communicates with the chip 30 via the Address/Data Line synchronously with a clock signal in the clock line CLK. When the imaging device carries out a writing operation into the chip, the imaging device transmits a writing command to the chip synchronously with a clock signal firstly, and transmits a bit data to be written every clock signal period to the chip 30 when the writing command has been send. The chip 30 starts to receive the data to be written synchronously with the clock signal received from the imaging device when received the writing command, and updates the data to be written into the normal read-write area 41 of the information storage unit 32.

When the information storage unit 32 is a nonvolatile memory rewritten by bits like EEPROM for example, the chip 30 is configured to receive one bit data synchronously with the clock signal and rewrites the one bit data into the information storage unit 32 immediately, then receive the next one bit data controlled by the control unit 33 after receiving the writing command from the imaging device. Specifically, the control unit 33 is configured to, when the control unit 33 receives the ink data writing command from the imaging device, in the next clock signal period, the control unit 33 points to the address of the storage area 111 to update the value of the times-of-writes parameter stored in the prioritized writing area 40 firstly and then receives one bit ink data to be written and rewrites the one bit ink data into the ink data address of the normal read-write area 41 to update the stored ink data. Which means, in the next clock signal period after the ink data writing command, the control unit 33 completes updating the value of the times-of-writes parameter preferentially and begins to update the ink data by bit.

Specifically, the information storage unit 32 is a sequential access nonvolatile memory, the address of the times-of-writes parameter in the prioritized writing area 40 is before and borders the address of the ink data in the normal read-write area 41, so as the control unit 33 continues to update the ink data after updating the times-of-writes parameter.

When the information storage unit 32 is a nonvolatile memory rewritten by pages like Flash for example, the control unit 33 is configured to comprise at least one volatile memory like SRAM for example. When the control unit 33 receives the ink data writing command from the imaging device, the control unit 33 starts to receive one bit ink data synchronously with the clock signal and write the one bit data into the volatile memory immediately, then receive the next one bit ink data. When all bits ink data received into the volatile memory, in a high/low level persistent period of a clock signal period, the control unit 33 points to the address of the storage area 111 to update the value of the times-of-writes parameter stored in the prioritized writing area 40 firstly and then rewrite all bits ink data from the volatile memory into the ink data address of the normal read-write area 41 to update the stored ink data. Which means, the chip 30 receives the ink data writing command and the ink data firstly and in the next clock-signal's high/low level persistent period, the control unit 33 completes updating the value of the times-of-writes parameter preferentially and updating all bits ink data thereafter.

Specifically, when all bits ink data received into the volatile memory, the control unit 33 needs to verify the value of the ink data and/or convert the format of the ink data. The control unit 33 is configured to update the value of the times-of-writes parameter stored in the prioritized writing area 40 and verify the value of the ink data and/or convert the format of the ink data meanwhile, and then rewrite all bits ink data into the normal read-write area 41 after updating the value of the times-of-writes parameter and verifying the value of the ink data and/or converting the format of the ink data finished.

Either working environment of the chip of imaging cartridge, mis-operation of the user, running out of read-write service life of the chip, or faults of the chip itself will lead to a fault of the chip. If a fault occurs to the chip of imaging cartridge when the chip was used only for a few times, then the fault may possibly be caused by the performance problem of the chip itself; if the chip of imaging cartridge has been read or written for many times, the reason of the fault may be that the chip is running out of normal service life.

When a fault occurs to the chip of imaging cartridge provided by the first embodiment, through reading the times-of-writes parameter in the prioritized writing area 40 of the information storage unit 32 in the chip of imaging cartridge, the times of writes of the chip can be determined, thus it can be determined whether the fault occurred due to the performance problem of the chip itself or that the normal service life is running out.

Example 2

Figure 8:
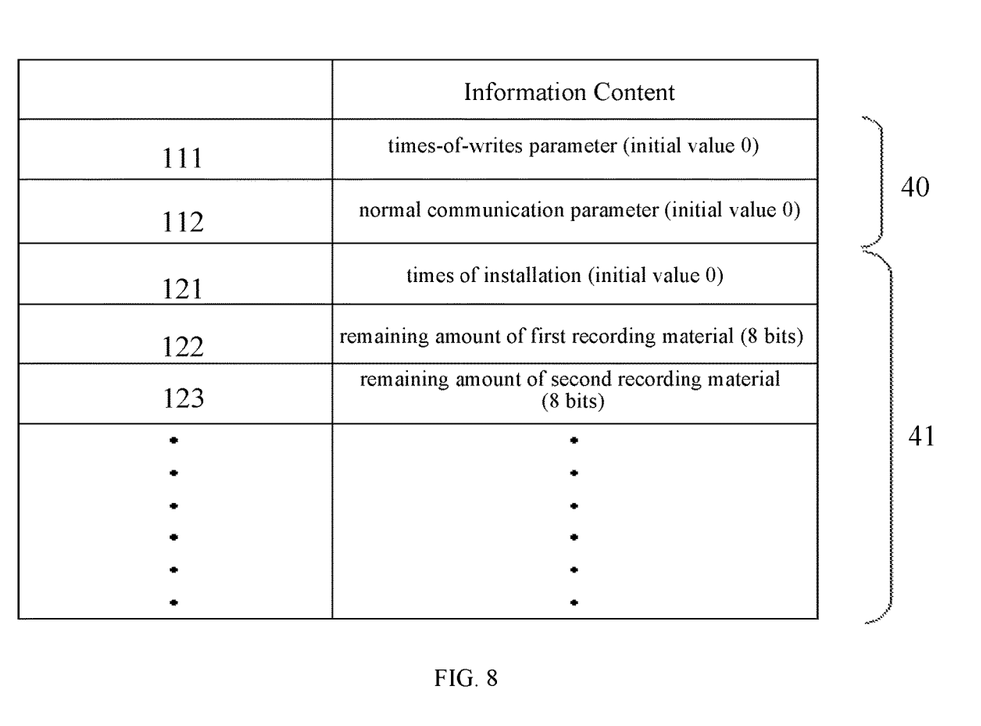
FIG. 8 is a schematic view of data arrangement of a chip information storage unit of an imaging cartridge in the second embodiment of the present invention.

In the second embodiment of the present invention, the triggering condition is the chip receives a writing command from the imaging device, and the chip service state parameter further includes a normal communication parameter relate to the chip. FIG. 8 is a schematic view of data arrangement of a chip information storage unit of an imaging cartridge in the second embodiment of the present invention. As shown in FIG. 8, the information storage unit 32 includes the prioritized writing area 40 and the normal read-write area 41. During the process when the imaging device accesses the information storage unit, the prioritized writing area 40 is rewritten in advance of the normal read-write area 41. The storage area 112 in the prioritized writing area 40 is used for storing the normal communication parameter for the chip (initial value is 0), which proactively updated by the control unit 33. In this embodiment, a first storage area 121 in the normal read-write area 41 is used for storing data of times of installation of the imaging cartridge, a second storage area 122 and a third storage area 123 are respectively used for storing remaining amount of a first recording material and remaining amount of a second recording material. The data stored in the normal read-write area 41 is used for ASIC 12 to perform normal read-write operations.

Figure 9:
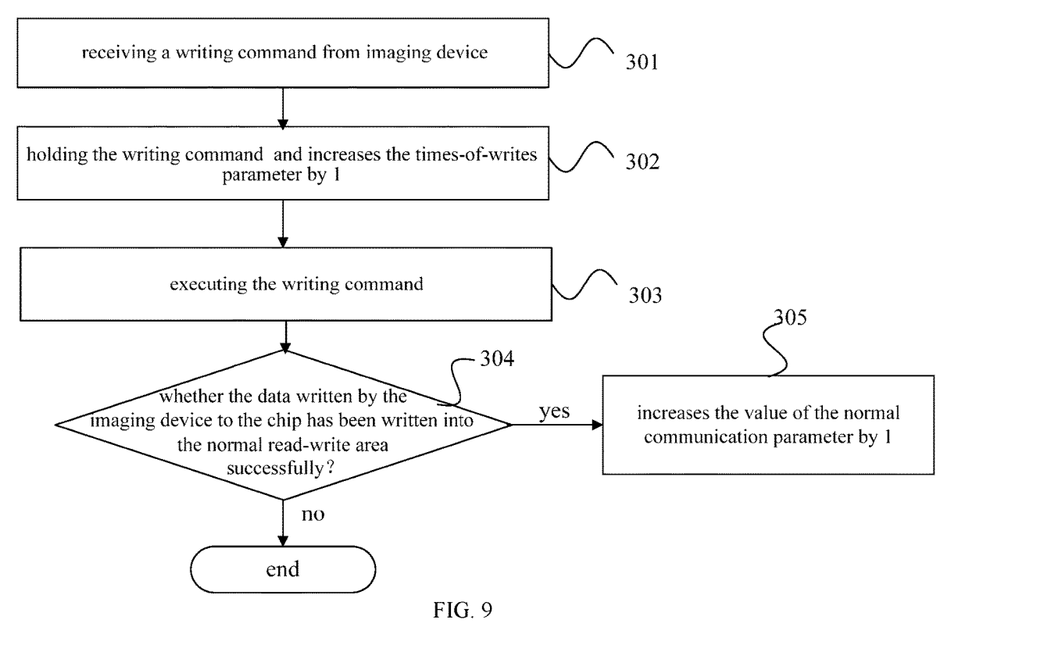
FIG. 9 is a flow diagram of a method for recording chip usage state information in a second embodiment of the present invention.

FIG. 9 is a flow diagram of a method for recording chip usage state information in the second embodiment of the present invention, as shown in FIG. 7 and FIG. 9, step 301, step 302 and step 303 are the same with step 201, step 202 and step 203 in the embodiment shown in FIG. 7, the method further includes:

Step 304, after executing step 303, the control unit 33 determines whether the data written by the imaging device to the chip has been written into the normal read-write area 41 successfully or not, if yes, execute step 305, or else, the process ends;

Step 305, the control unit 33 updates the normal communication parameter stored in the prioritized writing area 40. Specifically, the control unit 33 points to the location of storage area 112 so as to control the value of the normal communication parameter stored in the prioritized writing area 40 is updated, which specifically is to increase the value of the normal communication parameter by 1.

If the imaging device sends a writing command to the chip of imaging cartridge provided by the second embodiment of the present invention, but the data is not written into the information storage unit 32 successfully, there will be a situation that the times-of-writes parameter stored in the storage area 111 of the prioritized writing area 40 is larger than the normal communication parameter stored in the storage area 112 of the prioritized writing area 40. Thus the times of communication faults occurred to the chip can be determined through reading the times-of-writes parameter stored in the storage area 111 and the normal communication parameter stored in the storage area 112 of the prioritized writing area 40, and it can be specifically determined that in which time of executing the write operation command did the fault occur to the chip. Of course, the normal communication parameter can also be recorded through the following operations: when the chip receives a writing command sent by the imaging device, the control unit on the chip accesses the prioritized writing area, and increases the normal communication parameter stored in the prioritized writing area by 1; after the communication, the control unit on the chip determines whether the data written by the imaging device to the chip has been written into the information storage unit successfully or not, if not, then decreases the normal communication parameter by 1, if yes, then the process ends.

Example 3

Figure 10:
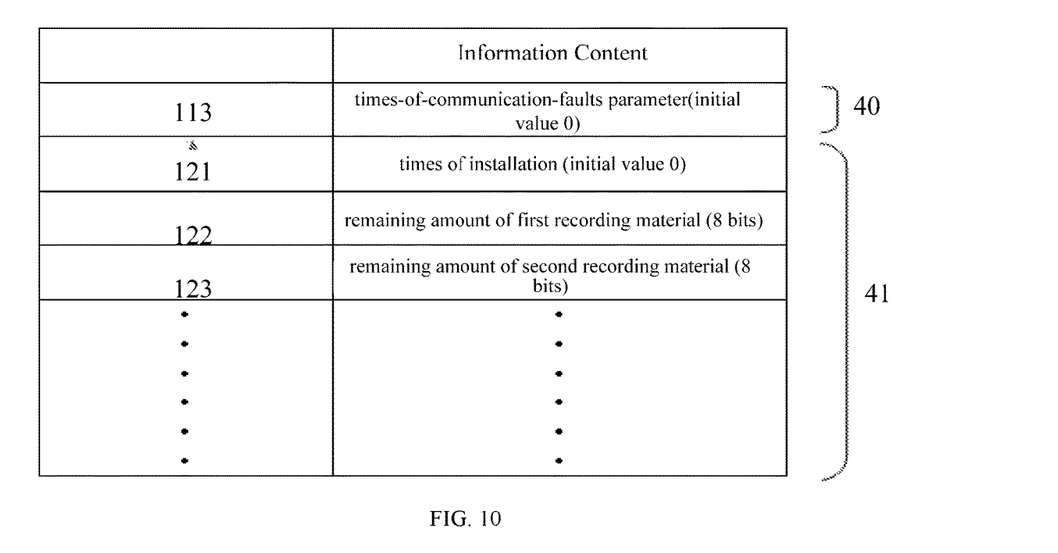
FIG. 10 is a schematic view of data arrangement of a chip information storage unit of an imaging cartridge in the third embodiment of the present invention.

In the third embodiment of the present invention, the triggering condition is the chip receives a writing command from the imaging device, and the chip service state parameter includes a times-of-communication-faults parameter relate to the chip. FIG. 10 is a schematic view of data arrangement of a chip information storage unit of an imaging cartridge in the third embodiment of the present invention. As shown in FIG. 10, the information storage unit 32 includes the prioritized writing area 40 and the normal read-write area 41. During the process when the imaging device accesses the information storage unit, the prioritized writing area 40 is rewritten in advance of the normal read-write area 41. The storage area 113 in the prioritized writing area 40 is used for storing the times-of-communication-faults parameter for the chip (initial value is 0), which proactively updated by the control unit 33. In this embodiment, a third storage area 121 in the normal read-write area 41 is used for storing data of times of installation of the imaging cartridge, a second storage area 122 and a third storage area 123 are respectively used for storing remaining amount of a first recording material and remaining amount of a second recording material. The data stored in the normal read-write area 41 is used for ASIC 12 to perform normal read-write operations.

Figure 11:
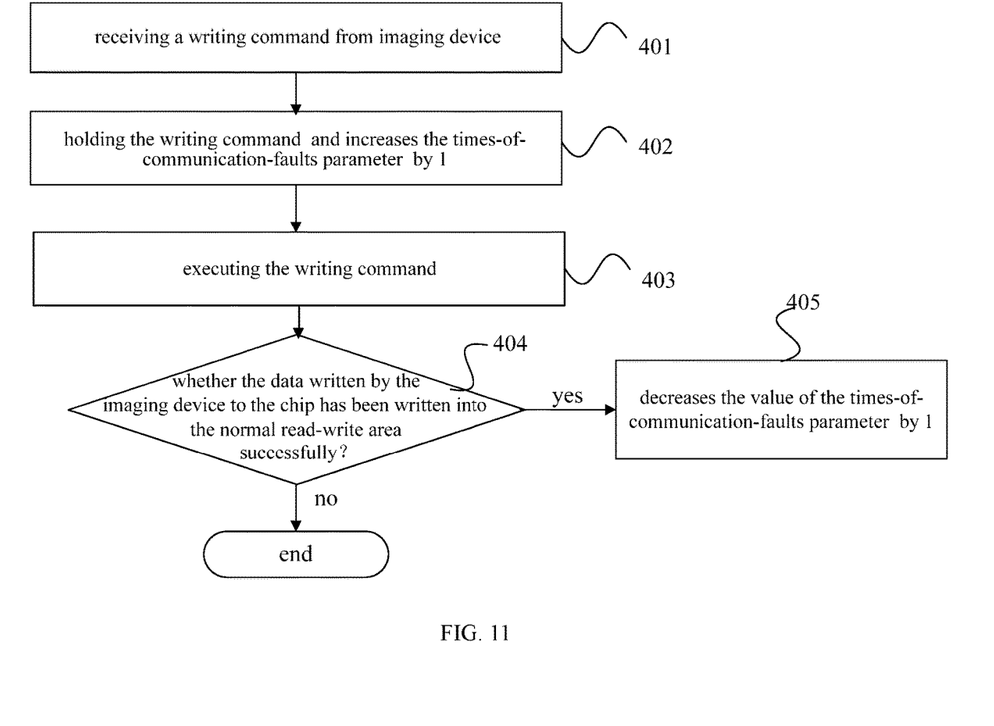
FIG. 11 is a flow diagram of a method for recording chip usage state information in a third embodiment of the present invention.

FIG. 11 is a flow diagram of a method for recording chip usage state information in the third embodiment of the present invention, as shown in FIG. 11, when the chip receives a writing command sent by the imaging device, the control unit 33, before executing the writing command from the imaging device, firstly accesses the prioritized writing area, which includes:

Step 401, the control unit 33 receives the writing command from ASIC 12.

Step 402, holding the writing command from ASIC 12 and updates the times-of-communication-faults parameter stored in the prioritized writing area 40. Specifically, the control unit 33 doesn't execute the writing command from the imaging device for the time being, and firstly points to the address of a storage area 113, so as to control the value of the times-of-communication-faults parameter stored in the prioritized writing area 40 is updated, which specifically is to increase the value of the times-of-communication-faults parameter by 1;

Step 403, executing the writing command from ASIC 12 and rewrite the data stored in the corresponding storage areas in the normal read-write area 41 after executing step 202. Specifically, the control unit 33 points to the location of storage area 121 and access to the normal read-write area 41, so as to control the data stored in the corresponding storage areas of the normal read-write area 41 are updated by the imaging device.

Step 404, after executing step 403, the control unit 33 on the chip determines whether the data written by the imaging device to the chip has been written into the normal read-write area 41 successfully or not, if yes, execute step 405, or else, the process ends;

Step 405, the control unit 33 updates the times-of-communication-faults parameter stored in the prioritized writing area 40. Specifically, the control unit 33 points to the location of storage area 113 so as to control the value of the times-of-communication-faults parameter stored in the prioritized writing area 40 is updated, which specifically is to decreases the value of the times-of-communication-faults parameter by 1.

If the imaging device sends a write command to the chip of imaging cartridge provided by the third embodiment of the present invention, but the data is not written into the information storage unit 32 successfully, the imaging device will resend a write command. If the chip can write the data, which is sent by the imaging device to the chip, into the information storage unit successfully when the imaging device resends the write command, then the imaging cartridge is enable to work, but the data of the times-of-communication-faults parameter will be stored in the prioritized writing area 40, which can represent the unsuccessful times of writes of the data into the information storage unit; if the imaging device sends the write command for multiple times, but the chip still does not write the data, which is sent by the imaging device to the chip, into the information storage unit successfully, then the imaging cartridge is unable to work, the data of the times-of-communication-faults parameter will be stored in the prioritized writing area 40. In this way, whether a fault occurs to the chip of imaging cartridge or not and the times-of-communication-faults can be determined through reading the times of communication faults parameter stored in the storage area 113 of the prioritized writing area 40 in the information storage unit of the chip.

Example 4

In the fourth embodiment of the present invention, the triggering condition is the chip receives a reading command from the imaging device, and the chip service state parameter includes a times-of-reads parameter relate to the chip.

On the basis of the first embodiment of the present invention, the procedure of the method for recording chip usage state information and the data arrangement of the information storage unit of the chip of imaging cartridge in this embodiment are substantially the same with those in the first embodiment, the difference therein is only to replace the writing command with a reading command sent by the imaging device, and replace the times-of-writes parameter with a times-of-reads parameter. When the chip receives the read/write operation command sent by the imaging device, the control unit on the chip updates the chip service state parameter stored in the prioritized writing area first, which includes:

In the chip of imaging cartridge in this embodiment, the control unit is specifically configured to hold the instruction from ASIC 12, doesn't execute the commands from the imaging device for the time being, and updates the chip service status parameter stored in the prioritized writing area 40 first, when the chip receives the reading command sent by ASIC 12, which specifically is to accesses the prioritized writing area 40 and increases the times-of-reads parameter by 1.

When a fault occurs to the chip of imaging cartridge provided by the fifth embodiment of the present invention, through reading the times-of-reads parameter in the prioritized writing area 40 in the chip of imaging cartridge, the times of reads of the chip can be determined, thus it can be determined whether the fault occurred due to the performance problem of the chip itself or that the normal service life is running out.

Example 5

In the fifth embodiment of the present invention, the triggering condition is the control unit 33 of the chip monitors a communication interference signal, and the chip service state parameter includes a times-of-communication-interference parameter relate to the chip.

In the method for recording chip usage state information, when the control unit 33 monitors a communication interference signal, the control unit 33 hold the instruction from ASIC 12, doesn't execute any commands from the imaging device for the time being, and updates the chip service status parameter stored in the prioritized writing area 40 first, which includes:

The control unit 33 monitors the communication signal sent by the imaging device all the time, when the chip is in a non-read-write state, and when the control unit on the chip monitors a high pulse signal from the imaging device, the control unit doesn't execute any commands from the imaging device for the time being, and accesses the prioritized writing area first, which specifically is to increases the times-of-communication-interference parameter stored in the prioritized writing area by 1;

When the chip is in a read-write state, the control unit 33 compares the voltage of the received communication signal with a preset voltage threshold, when the voltage of the communication signal exceeds the voltage threshold, doesn't execute any commands from the imaging device for the time being and accesses the prioritized writing area first, which specifically is to increases the times-of-communication-interference parameter stored in the prioritized writing area by 1; preferably, the above voltage threshold can be set as 5V.

In the chip of this embodiment, the control unit 33 is specifically configured to proactively access the prioritized writing area 40 and increase the times-of-communication-interference parameter stored in the prioritized writing area by 1 when the chip is in a non-read-write state and monitors a high pulse signal from the imaging device; compare the voltage of the received communication signal with a preset voltage threshold when the chip is in a read-write state, and when the voltage of the communication signal exceeds the voltage threshold, proactively access the prioritized writing area 40 and increase the times-of-communication-interference parameter stored in the prioritized writing area by 1.

When a fault occurs to the chip of imaging cartridge provided by the sixth embodiment of the present invention, through reading the times-of-communication-interference parameter stored in the prioritized writing area of the information storage unit in the chip of imaging cartridge, the times of interference suffered by the chip during the communication process can be determined, which is beneficial to finding the reason of the faults occurred to the chip.

The present invention further provides an imaging cartridge, which includes a chip of imaging cartridge in any of the above embodiments, through reading the chip service state parameter, which represents the usage state of the chip, in the prioritized writing area of the information storage unit in the chip of imaging cartridge and/or reading the data of the usage state of the imaging cartridge recorded in each storage area of the normal read-write area, the reason of the faults occurred to the imaging cartridge and the chip of imaging cartridge installed thereon can be found.

In addition, as for the prior art, the chip stores the information of remaining amount of recording materials, if the recording materials in the imaging cartridge run out (i.e. the information of remaining amount of recording materials reaches a threshold), the chip will no longer work, and the imaging cartridge will no longer work either even if the imaging cartridge is refilled, which causes a waste and environment pollution. In order to solve the problem, there is a kind of reset chip in the prior art: a reset module is added on a disposable chip, the module presets a reset threshold (for example, the information of remaining amount of recording materials is 10%), when the information of remaining amount of recording materials stored in the chip reaches the threshold, the chip will reset automatically (for example, the information of remaining amount of recording materials is updated as 100%), and the chip after reset can represent a new imaging cartridge. With respect to the reset chip, since the prioritized writing area and the normal read-write area are provided separately in all embodiments of the present invention, that is to say the information such as information of remaining amount of recording materials etc. is stored in the normal read-write area, therefore, when the information of remaining amount of recording materials stored in the chip reaches the threshold, the data updated is the data in the normal read-write area, and the data of the chip service state parameter which is recorded in the prioritized writing area and represents the chip usage state information will not lost due to reset of the chip.

In the method for recording chip usage state information, the chip of imaging cartridge and the imaging cartridge provided by the present invention, as a result of the arrangement of the prioritized writing area in the information storage unit of the chip of imaging cartridge and the method that when the chip receives a read/write operation command sent by the imaging device or the control unit on the chip monitors a communication interference signal, the prioritized writing area will firstly be accessed and the chip service state parameter are updated, in the chip of imaging cartridge, the imaging cartridge and the method for recording chip usage state information provided by these embodiments, the usage state information of the chip itself can be represented through the chip service state parameter recorded in the prioritized writing area, moreover, since the prioritized writing area will firstly be accessed, the function of the usage state information will not be affected no matter whether the operation of the imaging device on the chip is successful or not, which provides powerful information to find and solve the communication problems between the chip and the imaging device. When a fault occurs to the chip of imaging cartridge, through reading the chip service state parameter in the prioritized writing area of the information storage unit in the chip of imaging cartridge and performing data analysis on the chip service state parameter, it can be determined whether the fault occurred due to the performance problem of the chip itself or that the normal service life is running out, or the times of normal communication, times of communication faults and times of communication interference are obtained, further, by combining with data of usage state of the imaging cartridge recorded in each storage area in the normal read-write area, it is beneficial to finding the reason which causes the fault of the imaging cartridge and the fault of the chip.

The imaging device according to the present invention can be a device having imaging functions such as printer, facsimile machine, copier, word processor, all-in-one machine etc., the imaging cartridge can be an imaging component installed on the imaging device such as ink cartridge, toner cartridge etc., and the recording material can be ink, toner etc.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some of or all of the technical features in the technical solutions; but such modifications or replacements will not cause the essence of corresponding technical solutions to depart from the scope of the technical solutions of the embodiments of the present invention.

The invention claimed is:

1. A chip of an imaging cartridge, said imaging cartridge can install on an imaging device and the imaging cartridge chip couples with the imaging device by establishing a communication path between the imaging cartridge chip and the imaging device, the communication path comprises an address/data line and a clock signal line the imaging device conducts reading and writing operations to the imaging cartridge chip through the communication path by transmitting instructions or data via the address/data line and transmitting clock signal via the clock signal line as required by the imaging device, and the imaging cartridge chip comprises:
   a substrate, and
   an information storage section and a control section which are provided on the substrate, wherein:
   the information storage section comprises a prioritized writing area and a normal read-write area,
   the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device,
   the state information relating to the imaging cartridge stored in the normal read-write area comprises an ink data is about a remaining amount data of recording materials contained in the imaging cartridge, the control section is configured to:
   receive one bit of instructions or data synchronously with every clock signal period, and
   when the control section receives an ink data writing instruction from the imaging device, in the next clock signal period, update the chip service state parameter relating to the imaging cartridge chip stored in the prioritized writing area preferentially at first, and then receive one bit ink data to be written from the imaging device and rewrites the one bit ink data into the normal read-write area according to the ink data writing instruction from the imaging device.

2. The chip of an imaging cartridge according to claim 1, wherein:
   the information storage section is a nonvolatile memory rewritten by bits, and
   when receiving a writing command from the imaging device, the control section is configured to receive one bit data to be written from the imaging device synchronously with a clock signal period and rewrite the one bit data into the normal read-write area immediately, and then receive next one bit data to be written from the imaging device synchronously with next one clock signal period.

3. The chip of an imaging cartridge according to claim 2, wherein:
   the chip service state parameter relating to the imaging cartridge chip stored in the prioritized writing area comprises a times-of-writes parameter relating to the imaging cartridge chip,
   the control section is specifically configured to,
   when the control section receives the ink data writing instruction from the imaging device, in the next clock signal period, point to the address of the times-of-writes parameter in the prioritized writing area and increases the value of the times-of-writes parameter relating to the imaging cartridge chip by 1 preferentially at first, and
   then receive one bit ink data to be written from the imaging device and rewrite the one bit ink data into the ink data address of the normal read-write area according to the ink data writing instruction from the imaging device.

4. The chip of an imaging cartridge according to claim 3, wherein:
   the information storage section is a sequential access nonvolatile memory,
   the address of the times-of-writes parameter in the prioritized writing area is before and borders the address of the ink data in the normal read-write area, and
   the control unit continues to rewrite the ink data after updating the times-of-writes parameter.

5. The chip of an imaging cartridge according to claim 1, wherein:
   when the control section receives the ink data writing instruction from the imaging device, at first hold the reading or writing instruction from executing and in the next clock signal period, update the chip service state parameter relating to the imaging cartridge chip stored in the prioritized writing area preferentially at first, and then receive one bit ink data to be written from the imaging device and rewrites the one bit ink data into the normal read-write area according to the ink data writing instruction from the imaging device.

6. An imaging cartridge, containing recording materials, can install on an imaging device, said imaging cartridge comprising:
an imaging cartridge chip, coupling with the imaging device by establishing a communication path between the imaging cartridge chip and the imaging device when the imaging cartridge installs on the imaging device, wherein the communication path comprises a address/data line and a clock signal line, the imaging device conducts reading and writing operations to the imaging cartridge chip through the communication path by transmitting instructions or data via the address/data line and transmitting clock signal via the clock signal line as required by the imaging device, and the imaging cartridge chip comprises a substrate, an information storage section and a control section provided on the substrate, wherein:
the information storage section comprises a prioritized writing area and a normal read-write area,
the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device,
the state information relating to the imaging cartridge stored in the normal read-write area comprises an ink data is about a remaining amount data of recording materials contained in the imaging cartridge, and
the control section is configured to:
receive one bit of instructions or data synchronously with every clock signal period,
when the control section receives an ink data writing instruction from the imaging device, in the next clock signal period, update the chip service state parameter relating to the imaging cartridge chip stored in the prioritized writing area preferentially at first, and
then receive one bit ink data to be written from the imaging device and rewrites the one bit ink data into the normal read-write area according to the ink data writing instruction from the imaging device.

7. The imaging cartridge according to claim 6, wherein:
the information storage section is a nonvolatile memory rewritten by bits, and
when receiving a writing command from the imaging device, the control section is configured to receive one bit data to be written from the imaging device synchronously with a clock signal period and rewrite the one bit data into the normal read-write area immediately, and then receive next one bit data to be written from the imaging device synchronously with next one clock signal period.

8. The imaging cartridge according to claim 7, wherein:
the chip service state parameter relating to the imaging cartridge chip stored in the prioritized writing area comprises a times-of-writes parameter relating to the imaging cartridge chip, and
the control section is specifically configured to:
when the control section receives the ink data writing instruction from the imaging device, in the next clock signal period, point to the address of the times-of-writes parameter in the prioritized writing area and increases the value of the times-of-writes parameter relating to the imaging cartridge chip by 1 preferentially at first, and
then receive one bit ink data to be written from the imaging device and rewrites the one bit ink data into the ink data address of the normal read-write area according to the ink data writing instruction from the imaging device.

9. The imaging cartridge according to claim 8, wherein:
the information storage section is a sequential access nonvolatile memory,
the address of the times-of-writes parameter in the prioritized writing area is before and borders the address of the ink data in the normal read-write area, and
the control unit continues to rewrite the ink data after updating the times-of-writes parameter.

10. A chip of an imaging cartridge, wherein said imaging cartridge can install on an imaging device and the imaging cartridge chip couples with the imaging device by establishing a communication path between the imaging cartridge chip and the imaging device, the communication path comprises a address/data line and a clock signal line, the imaging device conducts reading and writing operations to the imaging cartridge chip through the communication path by transmitting instructions or data via the address/data line and transmitting clock signal via the clock signal line as required by the imaging device, and the imaging cartridge chip comprises:
a substrate, and
an information storage section and a control section which are provided on the substrate, wherein:
the information storage section comprises a prioritized writing area and a normal read-write area,
the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device,
the state information relating to the imaging cartridge stored in the normal read-write area comprises an ink data is about a remaining amount data of recording materials contained in the imaging cartridge, and
the control section is configured to:
receive one bit of instructions or data synchronously with every clock signal period,
when the control section receives an ink data writing instruction from the imaging device, start to receive the ink data by bits synchronously with the clock signal and write the ink data into a volatile memory of the control section by bits immediately, and
when all bits of the ink data received into the volatile memory, in a high/low level persistent period of a clock signal period, update the chip service state parameter relating to the imaging cartridge chip stored in the prioritized writing area preferentially at first, and then rewrite all bits of the ink data from the volatile memory into the normal read-write area.

11. The chip of an imaging cartridge according to claim 10, wherein:
the chip service state parameter relating to the imaging cartridge chip stored in the prioritized writing area comprises a times-of-writes parameter relating to the imaging cartridge chip,
the control section is specifically configured to:

when all bits of the ink data received into the volatile memory, in a high/low level persistent period of a clock signal period, point to the address of the times-of-writes parameter in the prioritized writing area and increase the value of the times-of-writes parameter relating to the imaging cartridge chip by 1 preferentially at first, and then rewrite all bits of the ink data into the ink data address of the normal read-write area.

12. The chip of an imaging cartridge according to claim 11, wherein:

when all bits of the ink data received into the volatile memory, the control section is further configured to verify the value of the ink data and/or convert the format of the ink data and update the value of the times-of-writes parameter stored in the prioritized writing area meanwhile, and then rewrite all bits of the ink data into the normal read-write area after finishing updating the value of the times-of-writes parameter and verifying the value of the ink data and/or converting the format of the ink data.

13. An imaging cartridge, containing recording materials, installed on an imaging device, said imaging cartridge comprising:

an imaging cartridge chip, coupling with the imaging device by establishing a communication path between the imaging cartridge chip and the imaging device when the imaging cartridge installs on the imaging device, wherein the communication path comprises a address/data line and a clock signal line, the imaging device may conduct reading and writing operations to the imaging cartridge chip through the communication path by transmitting instructions or data via the address/data line and transmitting clock signal via the clock signal line as required by the imaging device, and the imaging cartridge chip comprises a substrate, an information storage section and a control section provided on the substrate, wherein:

the information storage section comprises a prioritized writing area and a normal read-write area, the prioritized writing area stores a chip service state parameter relating to the imaging cartridge chip which is updated by the control section proactively all by itself, while the normal read-write area stores state information relating to the imaging cartridge which is read and updated by the control section passively according to instructions from the imaging device, the state information relating to the imaging cartridge stored in the normal read-write area comprises an ink data is about a remaining amount data of recording materials contained in the imaging cartridge, and the control section is configured to:

receive one bit of instructions or data synchronously with every clock signal period, when the control section receives an ink data writing instruction from the imaging device, start to receive the ink data by bits synchronously with the clock signal and write the ink data into a volatile memory of the control section by bits immediately, when all bits of the ink data received into the volatile memory, in a high/low level persistent period of a clock signal period, update the chip service state parameter relating to the imaging cartridge chip stored in the prioritized writing area preferentially at first, and then rewrite all bits of the ink data from the volatile memory into the normal read-write area.

14. The imaging cartridge according to claim 13, wherein:

the chip service state parameter relating to the imaging cartridge chip stored in the prioritized writing area comprises a times-of-writes parameter relating to the imaging cartridge chip, the control section is specifically configured to:

when all bits of the ink data received into the volatile memory, in a high/low level persistent period of a clock signal period, point to the address of the times-of-writes parameter in the prioritized writing area and increase the value of the times-of-writes parameter relating to the imaging cartridge chip by 1 preferentially at first, and then rewrite all bits of the ink data into the ink data address of the normal read-write area.

15. The imaging cartridge according to claim 14, wherein:

when all bits of the ink data received into the volatile memory, the control section is further configured to verify the value of the ink data and/or convert the format of the ink data and update the value of the times-of-writes parameter stored in the prioritized writing area meanwhile, and then rewrite all bits of the ink data into the normal read-write area after finishing updating the value of the times-of-writes parameter and verifying the value of the ink data and/or converting the format of the ink data.

* * * * *